Nov. 2, 1937.   R. H. CARSON   2,097,585

VALVE FOR PRESSURE COOKERS, STERILIZERS, AND THE LIKE

Filed Feb. 13, 1936

Inventor:
Robert H. Carson,
By Fisher, Clapp, Soans & Pond,
Attys.

Patented Nov. 2, 1937

2,097,585

UNITED STATES PATENT OFFICE 2,097,585

VALVE FOR PRESSURE COOKERS, STERILIZERS AND THE LIKE

Robert H. Carson, Chicago, Ill., assignor to Burpee Can Sealer Company, Chicago, Ill., a corporation of Illinois Application February 13, 1936, Serial No. 63,709

5 Claims. (Cl. 277—20)

This invention relates to an improved valve structure intended chiefly for use on pressure cookers, sterilizers, and the like, although capable of other applications, and designed to combine in a single structure the functions of a safety valve, a blow-off valve and an air vent valve.

Pressure cookers and sterilizers now on the market are equipped, usually on the cover thereof, with an adjustable safety valve which may be set to open at any predetermined steam pressure, and many of them are also equipped in addition to such safety valve, with what is known as a blow-off valve; that is, a valve that is manually opened at the end of the cooking operation to either vent the steam in the cooker to atmosphere, or, if the steam has condensed, to relieve the vacuum in order that the cover may be easily and safely removed.

The main object of this invention is to simplify and cheapen the cost of these accessories of a pressure cooker or sterilizer, by providing a valve of very simple and inexpensive construction, capable of serving the functions of both a safety valve and a blow-off valve, and also the function of an air vent valve; it being desirable at the beginning of the cooking or sterilizing operation to rid the upper portion of the vessel of the air contained therein.

My improved valve, in its preferred form, is illustrated in the accompanying drawing, in which—

Figure 1:
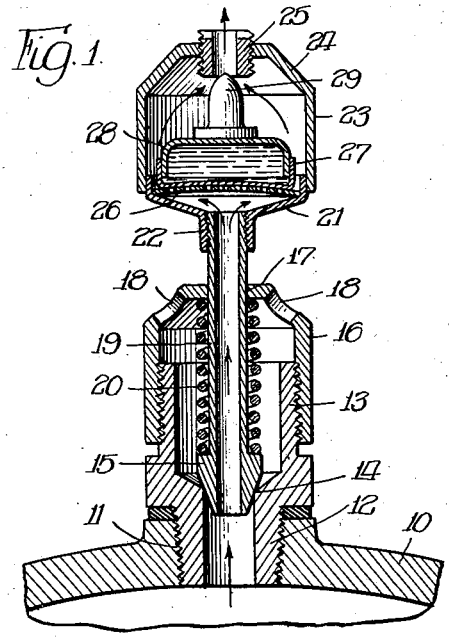
Fig. 1 is a vertical, axial section of the structure and of a portion of the cover on which it is mounted, showing the structure in air venting position.

Referring to the drawing, 10 designates a fragment of the cover of a pressure cooker or sterilizer to which the valve is applied, in the chief intended application thereof. In the cover 10 is a tapped hole 11 into which is tightly screwed a threaded nipple 12 on the lower end of a hollow valve casing 13. This valve casing is open at its upper end and is formed with a valve seat 14 with which cooperates an annular valve 15. Screwing on to the valve casing 13 is a cap member 16, the top of which is formed with a hole 17 and with lateral vent ports 18. The valve 15 has a tubular stem 19 that slidably extends through the hole 17 of the cap; and the bore of the valve stem extends through the valve 15 as shown. Encircling the valve stem 19 is a thrust spring 20 footed at its lower end on a shoulder of the valve, and at its upper end abutting against the top of the cap 16.

Screw-threaded on the upper end of the valve stem 19 is a housing or casing which carries an air vent valve and a thermal device for actuating said valve. This housing or casing, in the instance shown, comprises a lower cup-shaped member 21, the internally threaded stem or shank 22 of which screws onto the upper end of the valve stem 19, a cylindrical body member 23 and a cap or cover member 24 which may conveniently be made integral with the body member 23. Screwed into the top of the cap 24 is a short tube section 25, the lower end of which forms a valve seat.

Fitted into the lower cup member 21 of the casing is a transversely apertured or skeleton seat member 26, preferably slightly convex on its upper side; and resting on the seat 26 is the lower member 27 of a holder or container for a heat expansible liquid, the upper member 28 of this container carrying a valve 29 adapted to cooperate with the seat on the inner end of the member 25. This holder or container is filled with a volatile liquid that expands in volume on the application of heat thereto and contracts when cooled. The bottom wall of the lower section 27 of this container is in the nature of a spring diaphragm that normally has the form as shown in Fig. 1 but, under the internal pressure of the thermal liquid, assumes the reverse position shown in Fig. 2.

Figure 2:
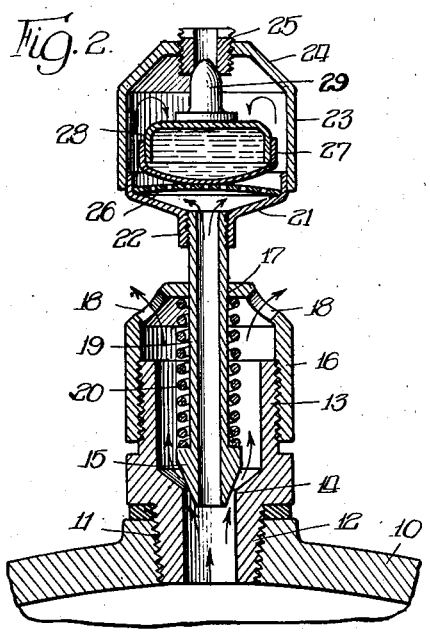
Fig. 2 is a similar view showing the structure in a position wherein it functions as a safety valve to discharge the steam when the latter has reached a predetermined pressure.

Briefly describing the operation, when the cooking or sterilizing vessel has been charged with its contents and the cover 10 clamped thereon, and the vessel is placed on the stove, the parts are in the position shown in Fig. 1. As the air in the top of the vessel becomes heated up, it rises through the nipple 12, the hollow valve 15 and its stem 19 into the upper housing or casing, flowing through the openings in the seat member 26, thence around the thermal liquid container and its valve 29, escaping to atmosphere through the vent tube 25. Steam is soon formed above the liquid in the vessel, and this steam aids in driving out the air as above described. The steam quickly heats up the thermal liquid in the container 27, 28, and the expansion of this liquid causes the diaphragm member of the liquid container to spring to the position shown in Fig. 2. This has the effect of raising the upper member of the liquid container and causing the valve 29 to close the air vent 25. As soon as this vent is closed, the pressure of the trapped steam increases, and when this pressure has reached a predetermined point, the valve 15 is raised, as shown in Fig. 2, and the steam is thus allowed to vent past the valve 15 through the vent openings 18; the device thus acting as a safety valve to prevent the generation of unsafe pressure within the cooking or sterilizing vessel. The point at which the device will function as a safety valve, of course, depends on the down thrust on the valve 15 of the spring 20; and this may be regulated as desired by screwing the cap 16 up or down. If it is screwed upwardly, the valve 15 will open at a lower steam pressure; and if it is screwed downwardly, the valve will open at a higher steam pressure. If the heat on the vessel is intermittent, the steam pressure therein will, of course, fall, and the valve 15 will automatically close.

Figure 3:
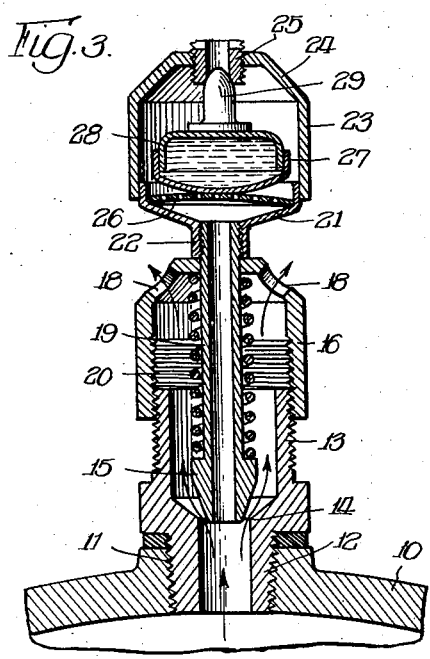
Fig. 3 is a similar view showing the parts in a position wherein the valve functions as a blow-off valve.

At the end of the cooking or sterilizing operation, the cap 16 is screwed upwardly until its upper end contacts with the threaded shank 22, whereupon a further upward movement of the cap 16 raises the valve 15 to a wide open position, as shown in Fig. 3, so that whatever steam may remain in the vessel is freely vented, or, if the steam in the vessel has condensed, the vacuum is relieved; thus making the removal of the cover 10 both easy and safe for the operator.

Figure 4:
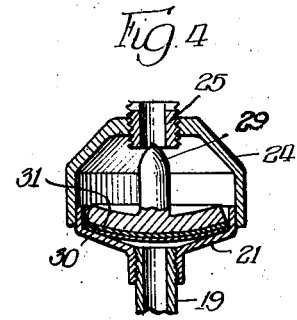
Figs. 4 and 5 are detail vertical sections of the upper member of the structure showing a modification of the thermal unit which opens and closes the top air vent valve.
Figure 5:
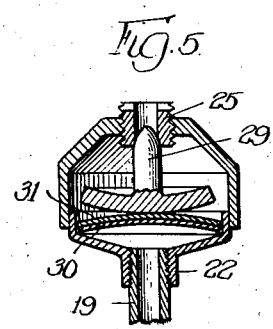

Figs. 4 and 5 illustrate a substitute for the thermal liquid vessel 27, 28, which may be used if desired, the same consisting of a thermal disk comprising two soldered or otherwise connected disks 30 and 31 of metals having different coefficients of expansion, so that when the structure is heated to a certain point, it will spring from the downwardly concave position illustrated in Fig. 4 to the upwardly convex position illustrated in Fig. 5, thus raising the valve 29 from open to closing position. Thermal strips and disks of this nature are well known and extensively used in various arts and, of course, no claim thereto per se is made herein.

From the foregoing it will be apparent how the device of this invention automatically performs the two functions of an air vent valve and a safety valve, and may be manually manipulated to perform the additional function of a blow-off valve at the end of the cooking or sterilizing operation.

Changes in the structural details may be resorted to within the scope of the claims.

I claim:

1. In a valve of the type described, the combination of an externally threaded valve casing open at one end and having on its other end a nipple and a valve seat at the inner end of the bore of the nipple, an internally threaded cap screwed onto said casing, said cap having a hole in its end wall and a vent opening, an annular valve cooperating with said seat, said valve having a hollow stem extending through the hole of said cap, a thrust spring between said cap and valve urging the latter to closed position, a housing mounted on the outer end of said stem and communicating interiorly with the latter, said housing having an air vent opening, a valve in said housing, and a heat-energized member in said housing for moving said last-named valve to close said air vent opening.

2. In a valve of the type described, the combination of an externally threaded valve casing open at one end and having on its other end a nipple and a valve seat at the inner end of the bore of the nipple, an internally threaded cap screwed onto said casing, said cap having a hole in its end wall and a vent opening, an annular valve cooperating with said seat, said valve having a hollow stem extending through the hole of said cap, a coil spring encircling said valve stem and confined endwise between the end wall of said cap and said valve and normally closing the latter on said seat, a housing mounted on the outer end of said stem and communicating interiorly with the latter, said housing having an air vent opening, a valve in said housing, a heat-energized member in said housing for moving said last named valve to close said air vent opening, and a stop member fast on said valve stem adapted to be contacted by the end wall of said cap when the latter is screwed outwardly to thereby open said first-named valve.

3. In a unitary valve structure for pressure cookers and the like, the combination of a valve casing interiorly ported to atmosphere, a combined safety and steam blow-off valve in said casing, a valve closing spring, manually operable means for opening said valve against the urge of said spring, means, including a normally open air vent valve, associated with said casing and controlling the venting of air from the vessel to which said structure is applied, and a heat responsive member energized by steam from said vessel for closing said air vent valve.

4. In a unitary valve structure for pressure cookers and the like, the combination of a valve casing interiorly ported to atmosphere and comprising a fixed part and a movable part, a combined safety and blow-off valve in said casing, a valve closing spring, means actuated by the movable part of said casing for opening said valve against the urge of said spring, means, including a normally open air vent valve, associated with said casing and controlling the venting of air from the vessel to which said structure is applied, and a heat responsive member energized by steam from said vessel for closing said air vent valve.

5. In a combination steam and air vent valve of the type described, the combination of a valve casing vented to atmosphere and having a nipple and a valve seat at the inner end of the bore of the nipple, an annular valve cooperating with said seat, said valve having a hollow stem for the outflow of both air and steam flowing through said valve, a valve closing spring bearing directly on said valve, a spring abutment member encircling said valve stem and adjustable lengthwise of the latter to vary the thrust of said spring on said valve, a housing mounted on and communicating with the interior of said stem, said housing having an air vent opening, a valve in said housing, and a heat energized member in said housing for moving said last-named valve to close said air vent opening.

ROBERT H. CARSON.